Jan. 19, 1971  R. E. TIBBETTS ET AL  3,556,642

MICRO-OBJECTIVE LENS SYSTEM

Filed Aug. 15, 1969  4 Sheets-Sheet 1

FIG. 1

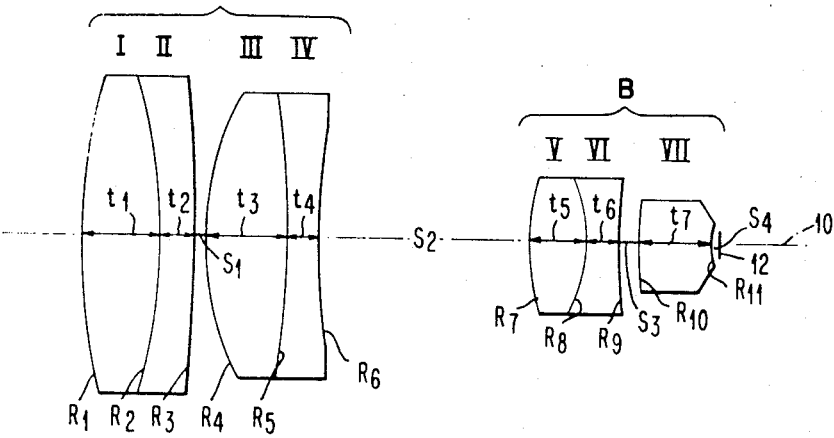

FIG. 2

| LENS | RADIUS | THICKNESS (t) OR AIRSPACE (S) | $N_D$ | V |
|---|---|---|---|---|
| | $m = \frac{1}{30}X$ | | NA .35 | |
| I | $R_1 = +1.6080F$<br>$R_2 = -1.3409F$ | $t_1 = .2120F$<br>$t_2 = .0949F$ | 1.52373 | 58.6 |
| II | $R_3 = -5.8278F$ | $S_1 = .0316F$ | 1.64904 | 33.8 |
| III | $R_4 = +.7973F$<br>$R_5 = -2.6705F$ | $t_3 = .2120F$<br>$t_4 = .0949F$ | 1.61702 | 54.9 |
| IV | $R_6 = +1.6396F$ | $S_2 = .5854F$ | 1.64904 | 33.8 |
| V | $R_7 = +.7032F$<br>$R_8 = -.4049F$ | $t_5 = .1487F$<br>$t_6 = .0949F$ | 1.52373 | 58.6 |
| VI | $R_9 = +2.0496F$ | $S_3 = .0475F$ | 1.64904 | 33.8 |
| VII | $R_{10} = +.7973F$<br>$R_{11} = +.3625F$ | $t_7 = .2089F$<br>$S_4 = .0098F$ | 1.69024 | 30.9 |

INVENTORS
RAYMOND E. TIBBETTS
JANUSZ S. WILCZYNSKI

BY John J. Goodwin

ATTORNEY

| LENS | RADIUS | THICKNESS (t) OR AIRSPACE (s) | $N_D$ | V |
|---|---|---|---|---|
| \multicolumn{5}{l|}{$m = \frac{1}{30} X$  NA .35} |
| I | $R_1 = +1.5825F$<br>$R_2 = -1.8135F$ | $t_1 = .2394F$<br>$t_2 = .0958F$ | 1.51733 | 52.16 |
| II | $R_3 = -7.6910F$ | $S_1 = .0319F$ | 1.66429 | 35.88 |
| III | $R_4 = +.8205F$<br>$R_5 = -4.2959F$ | $t_3 = .2394F$<br>$t_4 = .0958F$ | 1.51814 | 58.96 |
| IV | $R_6 = +1.6153F$ | $S_2 = .6010F$ | 1.66429 | 35.88 |
| VIII | $R_{12} = +.6875F$<br>$R_{13} = +1.3244F$ | $t_8 = .1149F$<br>$S_5 = .0319F$ | 1.51671 | 64.20 |
| V | $R_7 = +.5671F$<br>$R_8 = -.7321F$ | $t_5 = .1436F$<br>$t_6 = .0958F$ | 1.51671 | 64.20 |
| VI | $R_9 = +2.2089F$ | $S_3 = .0319F$ | 1.64752 | 33.88 |
| VII | $R_{10} = +1.8999F$<br>$R_{11} = +.3584F$ | $t_7 = .1915F$<br>$S_4 = .0196F$ | 1.64752 | 33.88 |

FIG. 5
FIG. 6
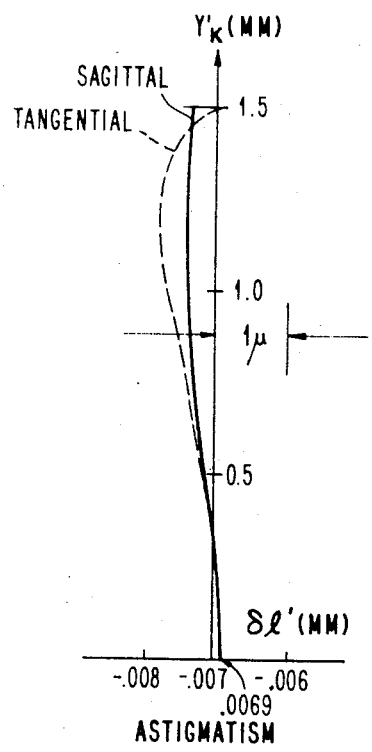
ASTIGMATISM
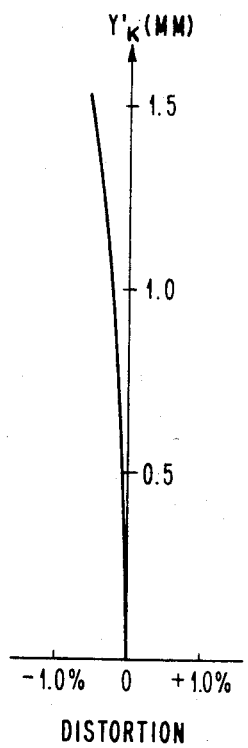
DISTORTION

United States Patent Office 3,556,642
Patented Jan. 19, 1971

3,556,642
MICRO-OBJECTIVE LENS SYSTEM
Raymond E. Tibbetts, Mahopac, and Janusz S. Wilczynski, Ossining, N.Y., assignors to International Business Machines Corporation, Armonk, N.Y., a corporation of New York
Continuation-in-part of application Ser. No. 594,109, Nov. 14, 1966. This application Aug. 15, 1969, Ser. No. 869,422
Int. Cl. G02b 9/34, 9/60
U.S. Cl. 350—216                                    3 Claims

ABSTRACT OF THE DISCLOSURE

A first micro-objective lens system including a first lens group having four lens elements and a second lens group having three lens elements and a second micro-objective lens system including a first lens group having four lens elements and a second lens group also having four lens elements. The first lens group of each system functions to correct for images in the center of the field and the second lens group functions to correct for images at the edge of the field thus providing a micro-objective lens system having extremely high resolution over a relatively small field. Eight embodiments of the second eight element lens system are provided to illustrate that the elements of the lens system are within specified constructional ranges.

---

This application is a continuation-in-part of copending parent patent application Ser. No. 594,109, filed Nov. 14, 1966, now abandoned.

BACKGROUND OF THE INVENTION

Field of the invention

The present invention relates to optical lenses and more particularly to an improved flat-field micro-objective lens group.

Description of the prior art

A lens system having lens elements arranged in two groups is shown in U.S. Pat. 2,713,808, issued July 26, 1955 to W. Klein. The constructional design of the lens system of the present invention is distinct over this reference.

SUMMARY OF THE INVENTION

Photographic lenses are employed in the fabrication of integrated circuits. The fabrication of integrated circuits requires "photomasks" which are photographic negatives having thousands of micro-images of tiny transistors, diodes and the like within a field having a diagonal length in the order of 3 millimeters. The quality of the integrated circuits depends heavily on the sharpness of the pattern of the photomask used to produce the circuit, and the sharpness of the photomask pattern is a function of the resolution of the photographic lens.

There are two basic methods used for producing photomasks, and they are referred to as the "one shot" method and the "step-and-repeat" method. In the "one shot" method a large original figure bearing thousands of patterns is reduced photographically in one step. In the "step-and-repeat" method a large single original figure is photographically reduced repeatedly on the photographic plate which is accurately positioned in predetermined X and Y directions.

In the "step-and-repeat" method a microscope objective lens may be used, however, such lens does not have uniformly high resolution over an entire field in the order of 3 millimeters, thus the images at the edges of the field would be disturbed due to astigmatism and coma and this could not be tolerated.

Accordingly, an object of the present invention is to provide a micro-objective lens having extremely high resolution over a relatively small field.

Another object of the present invention is to provide a micro-objective lens including a first group of lens elements whose main function is to correct for images in the center of the field and a second group of lens elements whose main function is to correct for images at the edges of the field.

A further object of the present invention is to provide a micro-objective lens for use in the fabrication of integrated circuit photomasks.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings:
FIG. 1 shows an optical diagram of an embodiment of micro-objective lens constructed according to the present invention.
FIG. 2 shows a chart of the constructional data for the lens of FIG. 1.
FIG. 5 shows a curve of the astigmatism of the lens embodiment of FIG. 3.
FIG. 6 shows a curve of the distortion of the lens embodiment of FIG. 3.

DESCRIPTION OF THE PREFERRED EMBODIMENT

Referring to FIG. 1 an embodiment of a micro-objective lens is shown including lens elements designated I, II, III, IV, V, VI and VII arranged along a common axis 10. Lens I is a bi-convex lens which is cemented to meniscus lens II and lens III is a bi-convex lens cemented to bi-concave lens IV. Lens V is a bi-convex lens cemented to bi-concave lens VI and lens VII is a thick meniscus lens.

In FIG. 1 the lens elements have been designated as belonging to two groups, group A including lens elements I, II, III and IV and group B including lens elements V, VI and VII. The lens elements in group A produce a major part (approximately 80%) of the total lens power and are particularly designed to reduce spherical aberration and the lenses in group B are designed to flatten the image field with a minimum of zonal astigmatism.

In FIG. 1 the radii of curvature of the lens elements are designated as $R_1$ through $R_{11}$, the axial thickness of the lens elements I through VII are designated as $t_1$ through $t_7$ respectively and the axial airspace distances between lens elements II and III, IV and V and VI and VII are designated as $S_1$, $S_2$ and $S_3$ respectively. $S_4$ is the distance between the vertex of radius $R_{11}$ of lens element VII and the image plane 12.

Referring to FIG. 2 a table of preferred constructional data for the lens embodiment of FIG. 1 is shown. The radii (R), thicknesses (t) and airspaces (S) are set forth in terms of effective focal length (F) of the lens group, which is approximately 31.5 millimeters. $N_D$ and V, respectively, represent the refractive index and the Abbe number of each lens element.

In a broader sense, the parameters of the lens embodiment of FIG. 1 can be permitted to vary within given ranges. The ranges of the constructional data for the lens embodiment of FIG. 1 are set forth in Table 1 as follows:

TABLE 1

$1.45F < +R_1 < 1.75F$ — $.19F < t_1 < .24F$
$1.22F < -R_2 < 1.45F$ — $.08F < t_2 < .11F$
$5.20F < -R_3 < 6.60F$ — $.026F < S_1 < .038F$
$0.70F < +R_4 < 0.90F$ — $.20F < t_3 < .23F$
$2.00F < -R_5 < 3.20F$ — $.09F < t_4 < .10F$
$1.45F < +R_6 < 1.75F$ — $.58F < S_2 < .59F$
$0.60F < +R_7 < 0.80F$ — $.13F < t_5 < .17F$
$0.35F < -R_8 < 0.45F$ — $.09F < t_6 < .10F$
$1.65F < +R_9 < 2.50F$ — $.041F < S_3 < .053F$
$0.70F < +R_{10} < 0.92F$ — $.20F < t_7 < .22F$
$0.31F < +R_{11} < 0.41F$

Figures 3, 4:
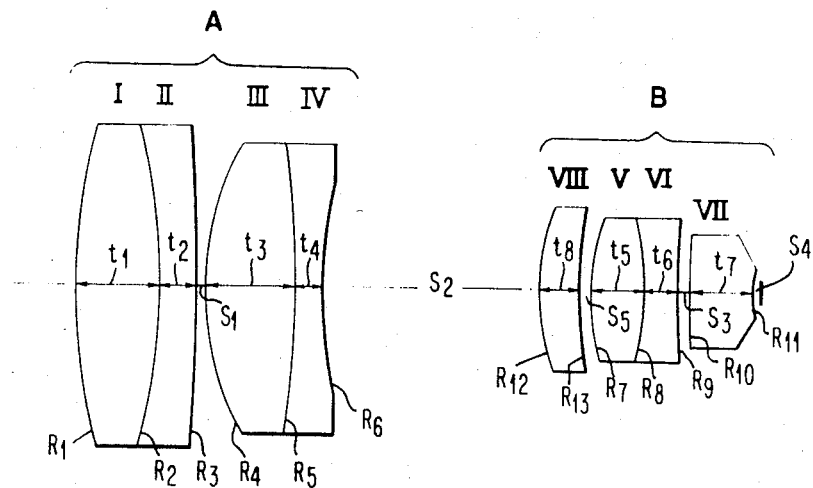
FIG. 3 shows an optical diagram of another embodiment of a micro-objective lens constructed according to the present invention.
FIG. 4 shows a chart of the constructional data for the lens of FIG. 3.

Referring to FIG. 3, another embodiment of the present invention is shown also including a lens group A and a lens group B. The lens groups A and B include seven lens elements which are essentially equivalent to the seven lens elements of FIG. 1 and have been correspondingly designated with the same reference numbers as lens elements I through VII with corresponding associated radii $R_1$ through $R_{11}$. An additional lens element VIII has been included in group B, between lens element IV of group A and lens element V of group B. Lens element VIII has radii designated as $R_{12}$ and $R_{13}$, a thickness $t_8$, and is separated from lens element V by an airspace $S_5$.

Referring to FIG. 4, a table of constructional data is set forth for the lens embodiment of FIG. 3. The radii, thickness and airspaces, however, can vary within given ranges which are set forth in the following Table 2.

TABLE 2

$1.43F < +R_1 < 1.73F$ — $.22F < t_1 < .26F$
$1.70F < -R_2 < 1.92F$ — $.08F < t_2 < .11F$
$6.50F < -R_3 8.60F$ — $0.25F \leq S_1 < .038F$
$0.70F < +R_4 < 0.90F$ — $.23F < t_3 < .25F$
$3.70F < -R_5 < 4.90F$ — $0.9F < t_4 < .10F$
$1.46F < +R_6 1.74F$ — $.590F \leq S_2 < .610F$
$0.64F < +R_{12} < 0.73F$ — $.10F < t_8 < .13F$
$1.24F < +R_{13} < 1.40F$ — $.029F < S_5 < .035F$
$0.48F < +R_7 < 0.64F$ — $.13F < t_5 < .15F$
$0.70F < -R_8 < 0.76F$ — $.09F < t_6 < .10F$
$1.90F < +R_9 < 2.50F$ — $.029F < S_3 < .035F$
$1.76F < +R_{10} < 2.04F$ — $.18F < t_7 < .20F$
$0.30F < +R_{11} < 0.40F$ Other embodiments of lens systems in accordance with the present invention may be selected from the ranges set forth in Table 2. The other embodiments will have the same extremely high resolution over a relatively small field as set forth for the embodiment of FIG. 3. In particular, six additional embodiments of lens systems will be hereinafter set forth as embodiments two through seven. The embodiments have different constructional data than that of FIG. 3 and particular parameters have been selected to be at the limits of the ranges set forth in Table 2. After specifying the six additional embodiments, the modulation transfer functions of the embodiments at axis, at .7 field and at full field will be set forth and compared in tabular form with the modulation transfer functions of the embodiment of FIG. 3 illustrated in FIGS. 7, 8 and 9. The modulation transfer functions of embodiments two through seven cannot be compared graphically with those shown in FIGS. 7, 8 and 9 because the scale used would not show any distinction. This in itself is an indication that all seven embodiments provide the same high resolution as will other embodiments of the invention with the ranges set forth in Table 2.

EMBODIMENT TWO $R_1 = +1.5596F$ — $t_1 = .2371F$
$R_2 = -1.7971F$ — $t_2 = .0947F$
$R_3 = -7.3789F$ — $S_1 = .0321F$
$R_4 = +0.8150F$ — $t_3 = .2366F$
$R_5 = -4.2632F$ — $t_4 = .0947F$
$R_6 = +1.5994F$ — $S_2 = .6190F$
$R_{12} = +0.6763F$ — $t_8 = .0986F$
$R_{13} = +1.3037F$ — $S_5 = .0314F$
$R_7 = +0.5687F$ — $t_5 = .1419F$
$R_8 = -0.7166F$ — $t_6 = .0947F$
$R_9 = +2.2897F$ — $S_3 = .0314F$
$R_{10} = +1.8705F$ — $t_7 = .1892F$
$R_{11} = +0.3533F$ — $S_4 = .0205F$

In this embodiment, $t_8$ is at its lower limit.

EMBODIMENT THREE $R_1 = +1.5412F$ — $t_1 = .7532F$
$R_2 = -1.8165F$ — $t_2 = .0950F$
$R_3 = -7.8725F$ — $S_1 = .0330F$
$R_4 = +0.8228F$ — $t_3 = .2379F$
$R_5 = -3.9343F$ — $t_4 = .0950F$
$R_6 = +1.6345F$ — $S_2 = .5963F$
$R_{12} = +0.7281F$ — $t_8 = .1144F$
$R_{13} = +1.4980F$ — $S_5 = .0321F$
$R_7 = +0.5680F$ — $t_5 = .1429F$
$R_8 = -0.7215F$ — $t_6 = .0950F$
$R_9 = +2.2415F$ — $S_3 = .0314F$
$R_{10} = +1.8880F$ — $t_7 = .1892F$
$R_{11} = +0.3553F$ — $S_4 = .0209F$

In this embodiment, $R_{12}$ is at its upper limit.

EMBODIMENT FOUR $R_1 = +1.5800F$ — $t_1 = .2393F$
$R_2 = -1.8179F$ — $t_2 = .0957F$
$R_3 = -7.7103F$ — $S_1 = .0319F$
$R_4 = +0.8194F$ — $t_3 = .2392F$
$R_5 = -4.3286F$ — $t_4 = .0957F$
$R_6 = +1.6129F$ — $S_2 = .6005F$
$R_{12} = +0.6873F$ — $t_8 = .1148F$
$R_{13} = +1.3248F$ — $S_5 = .0319F$
$R_7 = +0.5667F$ — $t_5 = .1435F$
$R_8 = -0.7316F$ — $t_6 = .0957F$
$R_9 = +1.8992F$ — $S_3 = .0319F$
$R_{10} = +1.6648F$ — $t_7 = .1913F$
$R_{11} = +0.3580F$ — $S_4 = .0195F$

In this embodiment, $R_9$ is at its lower limit.

EMBODIMENT FIVE $R_1 = +1.5785F$ — $t_1 = .2396F$
$R_2 = -1.8168F$ — $t_2 = .0958F$
$R_3 = -7.7989F$ — $S_1 = .0387F$
$R_4 = +0.8197F$ — $t_3 = .2365F$
$R_5 = -4.3072F$ — $t_4 = .0958F$
$R_6 = +1.6180F$ — $S_2 = .5996F$
$R_{12} = +0.6875F$ — $t_8 = .1151F$
$R_{13} = +1.3233F$ — $S_5 = .0321F$
$R_7 = +0.5676F$ — $t_5 = .1439F$
$R_8 = -0.7326F$ — $t_6 = .0958F$
$R_9 = +2.2061F$ — $S_3 = .0321F$
$R_{10} = +1.8976F$ — $t_7 = 1918F$
$R_{11} = +0.3584F$ — $S_4 = .0216F$

In this embodiment, $S_1$ is at its upper limit.

EMBODIMENT SIX $R_1 = +1.5730F$ — $t_1 = .2664F$
$R_2 = -1.8091F$ — $t_2 = .0957F$
$R_3 = -7.8983F$ — $S_1 = .0321F$
$R_4 = +0.8171F$ — $t_3 = .2362F$
$R_5 = -4.2631F$ — $t_4 = .0893F$
$R_6 = +1.6189F$ — $S_2 = .6001F$
$R_{12} = +0.6852F$ — $t_8 = .1151F$
$R_{13} = +1.3165F$ — $S_5 = .0322F$
$R_7 = +0.5674F$ — $t_5 = .1444F$

EMBODIMENT SIX—Continued $R_8 = -0.7322F$—$t_6 = .0957F$
$R_9 = +2.2063F$—$S_3 = .0321F$
$R_{10} = +1.8947F$—$t_7 = .1916F$
$R_{11} = +0.3580F$—$S_4 = .0230F$ In this embodiment, $t_4$ is at its lower limit.

EMBODIMENT SEVEN $R_1 = +1.5789F$—$t_1 = .2656F$
$R_2 = -1.8048F$—$t_2 = .0954F$
$R_3 = -7.7527F$—$S_1 = .0318F$
$R_4 = +0.8162F$—$t_3 = .2354F$
$R_5 = -4.2637F$—$t_4 = .0954F$
$R_6 = +1.6109F$—$S_2 = .5984F$
$R_{12} = +0.6846F$—$t_8 = .1145F$
$R_{13} = +1.3184F$—$S_5 = .0318F$
$R_7 = +0.5658F$—$t_5 = .1438F$
$R_8 = -0.7295F$—$t_6 = .0954F$
$R_9 = +2.2074F$—$S_3 = .0318F$
$R_{10} = +1.8936F$—$t_7 = .1909F$
$R_{11} = +0.3570F$—$S_4 = .0197F$

In this embodiment, $t_1$ is beyond its upper limit.

The following table sets forth the modulation transfer functions of the seven embodiments. It can be seen that although given parameters were selected at the end of the ranges, the seven embodiments provide almost equal performance.

COMPARISON OF PREFERRED EMBODIMENT WITH OTHER EMBODIMENTS AT EDGES OF LIMITS

| Embodiment | Percent of limiting frequency | Percent MTF | | | | |
|---|---|---|---|---|---|---|
| | | Axis | .7 field Sag | .7 field Tan | Full field Sag | Full field Tan |
| Preferred | 25 | 64.0 | 64.6 | 62.0 | 62.5 | 59.5 |
| | 50 | 37.1 | 37.5 | 36.7 | 35.7 | 35.4 |
| | 75 | 14.4 | 14.1 | 12.0 | 14.0 | 12.7 |
| Two | 25 | 64.6 | 64.1 | 61.5 | 62.5 | 60.0 |
| | 50 | 37.6 | 36.7 | 35.5 | 35.3 | 35.4 |
| | 75 | 14.4 | 13.6 | 11.4 | 13.4 | 12.5 |
| Three | 25 | 62.8 | 64.8 | 63.2 | 62.5 | 59.4 |
| | 50 | 35.2 | 36.6 | 36.7 | 34.7 | 34.2 |
| | 75 | 13.6 | 13.4 | 12.5 | 12.9 | 12.8 |
| Four | 25 | 64.0 | 64.6 | 62.4 | 62.3 | 58.9 |
| | 50 | 37.2 | 37.5 | 37.1 | 35.5 | 34.5 |
| | 75 | 14.4 | 14.1 | 12.4 | 13.9 | 12.9 |
| Five | 25 | 64.1 | 64.4 | 61.5 | 62.5 | 59.8 |
| | 50 | 37.4 | 37.5 | 36.3 | 35.8 | 35.8 |
| | 75 | 14.4 | 14.0 | 11.6 | 14.0 | 12.6 |
| Six | 25 | 64.2 | 64.2 | 61.1 | 62.3 | 59.7 |
| | 50 | 37.7 | 37.4 | 36.0 | 35.8 | 35.9 |
| | 75 | 14.4 | 14.0 | 11.4 | 14.0 | 12.4 |
| Seven | 25 | 64.4 | 64.2 | 61.0 | 62.4 | 59.3 |
| | 50 | 37.9 | 37.5 | 36.1 | 36.0 | 35.6 |
| | 75 | 14.4 | 14.3 | 11.5 | 14.3 | 12.7 |

An advantageous feature of the lens of the present invention is that the diaphragm of the objective is formed by the ninety degree bevel placed on the surface $R_6$, that is, the annular flat on surface $R_6$ is employed instead of a mechanical diaphragm.

The location of the diaphragm on the surface of $R_6$ is significant, because if the diaphragm were, for example, placed in contact with surface $R_1$, the upper rays of the oblique bundle would strike at rather large angles of incidence on surface $R_7$ causing a large amount of over-corrected higher order astigmatism, necessitating a correspondingly large amount of compensating primary astigmatism. Such a state of astigmatic correction would yield poor results over the desired field, effecting a high reject rate of micro-circuits and making machine operation more difficult by decreasing the usable focal range. The zonal astigmatism must necessarily be kept quite small due to the working numerical aperture (NA) of the present lens which is .35.

If, on the other hand, the diaphragm were to be moved too close to the surface $R_7$, lens group A would have to become larger in diameter to prevent vignetting and the correct amount of higher order astigmatism from lens group B would naturally diminish as the diaphragm approaches surface $R_7$. With the diaphragm properly located, the astigmatic correction is shown in FIG. 5. All optical correction curves (FIGS. 5 through 9) have been calculated using the embodiment in FIG. 3. In FIG. 5 it is seen that the residual zonal astigmatism is less than one half micron which is well within the focal range of +1.7 microns, ($\lambda = 4047$ angstroms). The focus of the tangential fan is denoted in FIG. 5 by "tang" and that of the sagittal fan by "sag." The placement of the diaphragm on surface $R_6$ is not mandatory, and it may be placed anyplace in the large central airspace $S_2$. In conventional microscope objectives, the diaphragm or anti-glare stop is usually placed in contact with surface $R_1$. This location is due to ease of mounting and also that at most, with respect to astigmatism, a flat tangential field is demanded. Thus, with spherical aberration and coma corrected, astigmatism is a constant for the system and independent of the diaphragm position.

The lens of the present invention makes full use of this parameter, stop position, as described above, effecting an additional control of higher order astigmatism and comas. The curve of the distortion is shown in FIG. 6.

Figure 7:
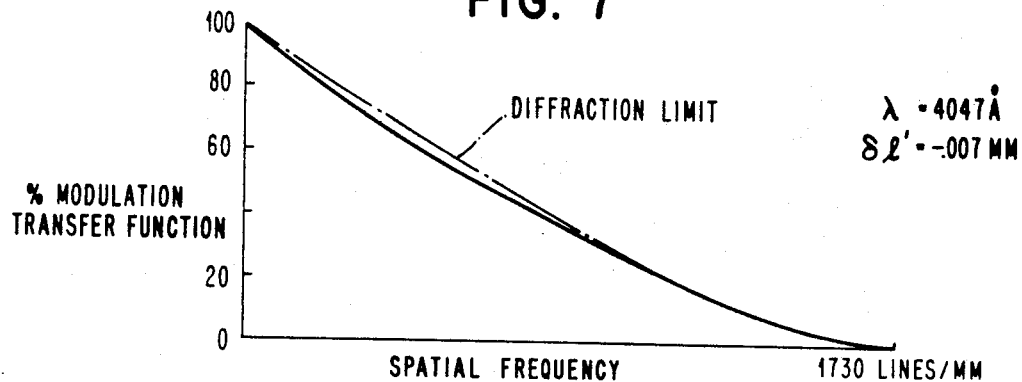
FIGS. 7, 8 and 9 show curves of the modulation transfer functions of the lens embodiment of FIG. 3 calculated along the axis, at .7 field, and at full field respectively.
Figure 8:
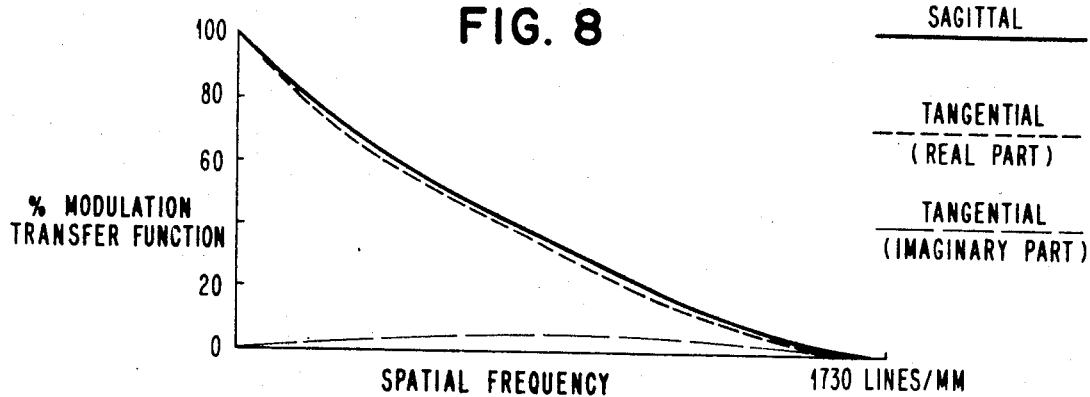
Figure 9:
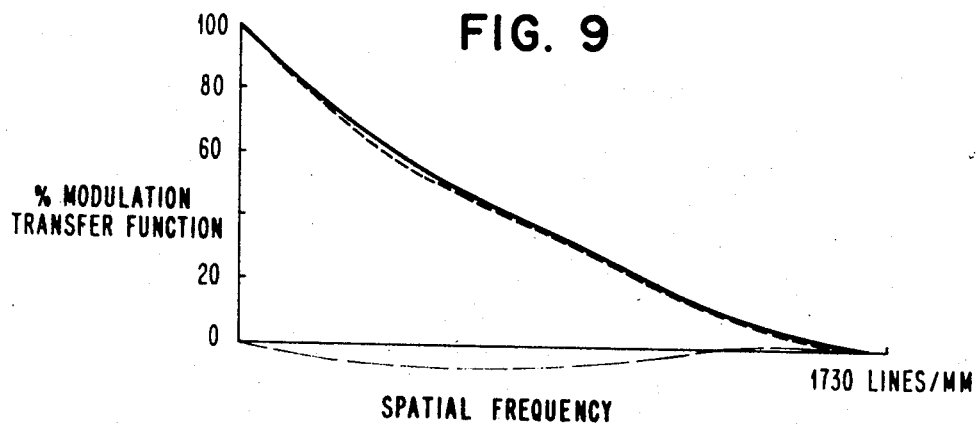

The high state of optical corrections is seen by the modulation transfer functions in FIGS. 7, 8 and 9, the calculation being done at a focal length of approximately 31.5 millimeters at a reduction of 30 × over an image field of 3.0 millimeters diameter. All calculations are done at a common focal setting, 7 microns in front of the paraxial focal plane. FIG. 7 shows the calculation for the axial bundle while FIGS. 8 and 9 are calculated at .7 field and full field respectively. The uniformly high correction is readily apparent by the similarity of the curves together with a slight balanced comatic residual denoted by the imaginary part of the tangential fan. This small comatic residual is, however, of a balanced state and is so shown by the reversal of sign of the imaginary part of the tangential fan.

Another important feature of the lens of the present invention is the simultaneous correction of the axial and transverse chromatic aberrations at a predetermined zone of the field. The latter aberration known also as the chromatic difference of magnification is removed in a conventional microscope objective by using a compensating eyepiece. This aberration is introduced by the rather strong simple elements comprising group B. However, a lens used for reduction photography must work without a compensating eyepiece and another means of controlling this aberration must be introduced. This correction is accomplished mainly in group B by the careful choice of glasses with respect to their partial dispersions making possible correction of the transverse chromatic aberration giving a broader wavelength range with improved performance.

The embodiment shown in FIG. 1 has been designed to perform best at a wavelength range centered around 5461 angstroms while the embodiment shown in FIG. 3 has been designed to perform best at a range around 4047 angstroms. Because of the decreased wavelength, the wave aberrations are larger in the near ultraviolet region than in the visible region. Therefore, it is desirable to reduce the geometric aberrations at least by the ratio of the wavelengths in order to retain the same wave correction. For this reason, group B in FIG. 3 is slightly more complex than group B in FIG. 1, resulting in a considerably higher level of performance.

While the invention has been particularly shown and described with reference to preferred embodiments thereof, it will be understood by those skilled in the art that various changes in form and details may be made therein without departing from the spirit and scope of the invention.

What is claimed is:
1. A micro-objective lens comprising a first group of optically aligned lens elements and a second group of lens elements optically aligned with said first group of lens elements,
said first group of lens elements including a first lens element which is a bi-convex lens, a second lens element which is a meniscus lens cemented to said first lens element, a third lens element which is a bi-convex lens and a fourth lens element which is a bi-concave lens cemented to said third lens element,
said second group of lens elements including a fifth lens element which is a bi-convex lens and a sixth lens element which is a bi-concave lens cemented to said fifth lens element, and a seventh lens element which is a thick meniscus singlet, said lens elements having numerical data substantially as follows:

| Lens | Radius | Thickness ($t$) or airspace ($S$) | $N_D$ | V |
|---|---|---|---|---|
| I | $R_1=+1.6080F$ | $t_1=.2120F$ | 1.52373 | 58.6 |
| II | $R_2=-1.3409F$ | $t_2=.0949F$ | 1.64904 | 33.8 |
|  | $R_3=-5.8278F$ | $S_1=.0316F$ |  |  |
| III | $R_4=+.7973F$ | $t_3=.2120F$ | 1.61702 | 54.9 |
| IV | $R_5=-2.6705F$ | $t_4=.0949F$ | 1.64904 | 33.8 |
|  | $R_6=+1.6396F$ | $S_2=.5854F$ |  |  |
| V | $R_7=+.7032F$ | $t_5=.1487F$ | 1.52373 | 58.6 |
| VI | $R_8=-.4049F$ | $t_6=.0949F$ | 1.64904 | 33.8 |
|  | $R_9=+2.0496F$ | $S_3=.0475F$ |  |  |
| VII | $R_{10}=+.7973F$ | $t_7=.2089F$ | 1.69024 | 30.9 |
|  | $R_{11}=+.3625F$ | $S_4=.0098F$ |  |  | wherein $R_1$ through $R_{11}$ represent the radii of curvature of the associated individual lens elements,
$t_1$ through $t_7$ represent the axial thicknesses of the associated individual lens elements,
$S_1$ through $S_4$ represent the axial spacing between the associated lens elements,
$N_D$ represents the refractive index of the associated individual lens elements,
V represents the Abbe number of the associated individual lens elements,
and F represents the effective focal length of the lens group.

2. A micro-objective lens including eight optically aligned lens elements wherein said first lens element has radii of curvature $R_1$ and $R_2$ and thickness $t_1$ said second lens element has radii of curvature $R_2$ and $R_3$ and thickness $t_2$, said third lens element has radii of curvature $R_4$ and $R_5$ and thickness $t_3$, said fourth lens element has radii of curvature $R_5$ and $R_6$ and thickness $t_4$, said fifth lens element has radii of curvature $R_7$ and $R_8$ and thickness $t_5$, said sixth lens element has radii of curvature $R_8$ and $R_9$ and thickness $t_6$, said seventh lens element has radii of curvature $R_{10}$ and $R_{11}$ and thickness $t_7$ and eighth lens element has radii of curvature $R_{12}$ and $R_{13}$ and thickness $t_8$,
said second and third lens elements are separated by an axial distance $S_1$, said fourth and eighth lens elements are separated by an axial distance $S_2$, said sixth and seventh lens elements are separated by an axial distance $S_3$, and said fifth and eighth lens elements are separated by an axial distance $S_5$, and wherein said radii, thicknesses and spacings are within limits as follows where F is the effective focal length of the lens group:

$1.43F<+R_1<1.73F$     $.22F<t_1<.26F$
$1.70F<-R_2<1.92F$     $.08F<t_2<.11F$
$6.50F<-R_3<8.60F$     $0.26F<S_1<.038F$
$0.70F<+R_4<0.90F$     $.23F<t_3<.25F$
$3.70F<-R_5<4.90F$     $.09F<t_4<.10F$
$1.46F<+R_6<1.74F$     $.590F<S_2<.610F$
$0.64F<+R_{12}<0.73F$     $.10F<t_8<.13F$
$1.24F<+R_{13}<1.40F$     $0.29F<S_5<.035F$
$0.48F<+R_7<0.64F$     $.13F<t_5<.15F$
$0.70F<-R_8<0.76F$     $.09F<t_6<.10F$
$1.90F<+R_9<2.50F$     $0.29F<S_3<.035F$
$1.76F<+R_{10}<2.04F$     $.18F<t_7<.20F$
$0.30F<+R_{11}<0.40F$

3. A micro-objective lens comprising a first group of optically aligned lens elements and a second group of lens elements optically aligned with said first group of lens elements,
said first group of lens elements including a first lens element which is a bi-convex lens, a second lens element which is a meniscus lens cemented to said first lens element, a third lens element which is a bi-convex lens and a fourth lens element which is a bi-concave lens cemented to said third lens element,
said second group of lens elements including a fifth lens element which is a bi-convex lens and sixth lens element which is a bi-concave lens cemented to said fifth lens element, a seventh lens element which is a thick meniscus singlet, and an eighth lens element which is a meniscus singlet, said lens elements having numerical data substantially as follows:

| Lens | Radius | Thickness ($t$) or airspace ($S$) | $N_D$ | V |
|---|---|---|---|---|
| I | $R_1=+1.5825F$ | $t_1=.2394F$ | 1.51733 | 52.16 |
| II | $R_2=-1.8135F$ | $t_2=.0958F$ | 1.66429 | 35.88 |
|  | $R_3=-7.6910F$ | $S_1=.0319F$ |  |  |
| III | $R_4=+.8205F$ | $t_3=.2394F$ | 1.51844 | 58.96 |
| IV | $R_5=-4.2959F$ | $t_4=.0958F$ | 1.66429 | 35.88 |
|  | $R_6=+1.6153F$ | $S_2=.6010F$ |  |  |
| VIII | $G_{12}=+.6875F$ | $t_8=.1149F$ | 1.51671 | 64.20 |
|  | $G_{13}=+1.3244F$ | $S_5=.0319F$ |  |  |
| V | $R_7=+.5671F$ | $t_5=.1436F$ | 1.51671 | 64.20 |
| VI | $R_8=-.7321F$ | $t_6=.0958F$ | 1.64752 | 33.88 |
|  | $R_9=+2.2089F$ | $S_3=.0319F$ |  |  |
| VII | $R_{10}=+1.8999F$ | $t_7=.1915F$ | 1.64752 | 33.88 |
|  | $R_{11}+.3584F$ | $S_4=.0196F$ |  |  | wherein $R_1$ through $R_{13}$ represents the radii of curvature of the associated individual lens elements,
$t_1$ through $t_8$ represent the axial thicknesses of the associated individual lens elements,
$S_1$ through $S_5$ represents the axial spacing between the associated lens elements,
$N_D$ and V respectively represent the refractive index and the Abbe number of the associated individual lens elements,
and F represents the effective focal length of the lens group.

References Cited
UNITED STATES PATENTS 2,713,808    7/1955    Klein _____ 350—220X
3,450,463    6/1969    Yasuda _____ 350—215X JOHN K. CORBIN, Primary Examiner U.S. Cl. X.R.

350—209, 224